United States Patent
Aggarwal et al.

(10) Patent No.: US 10,475,189 B2
(45) Date of Patent: Nov. 12, 2019

(54) CONTENT AWARE, SPATIALLY ADAPTIVE AUTOMATED THRESHOLDING OF IMAGES

(71) Applicant: ADOBE INC., San Jose, CA (US)

(72) Inventors: Vipul Aggarwal, New Delhi (IN); Naveen Prakash Goel, Noida (IN)

(73) Assignee: Adobe Inc., San Jose, CA (US)

( * ) Notice: Subject to any disclaimer, the term of this patent is extended or adjusted under 35 U.S.C. 154(b) by 61 days.

(21) Appl. No.: 15/838,329

(22) Filed: Dec. 11, 2017

(65) Prior Publication Data
US 2019/0180445 A1 Jun. 13, 2019

(51) Int. Cl.
*G06T 7/136* (2017.01)
*G06T 5/00* (2006.01)

(52) U.S. Cl.
CPC .............. *G06T 7/136* (2017.01); *G06T 5/001* (2013.01); *G06T 2207/20012* (2013.01); *G06T 2207/20164* (2013.01); *G06T 2207/30176* (2013.01)

(58) Field of Classification Search
CPC . G06T 2207/20012; G06T 2207/20164; G06T 2207/30176; G06T 5/001; G06T 7/136
See application file for complete search history.

(56) References Cited

U.S. PATENT DOCUMENTS

| 4,442,544 A | 4/1984 | Moreland et al. |
| 5,781,658 A | 7/1998 | O'Gorman |
| 8,134,990 B2 | 3/2012 | Kangas et al. |
| 2007/0253040 A1* | 11/2007 | Lee .......................... G06K 9/38 358/518 |

OTHER PUBLICATIONS

Kieri, Andreas, "Context dependent thresholding and filter selection for optical character recognition", Uppsala Universitet, Nov. 2012, 48 pages.
Badoiu, Vlad et al., "OCR Quality Improvement Using Image Preprocessing", Journal of Information Systems & Operations Management, Jul. 2016, 13 pages.

* cited by examiner

*Primary Examiner* — Leon Flores
(74) *Attorney, Agent, or Firm* — Brake Hughes Bellermann LLP

(57) ABSTRACT

Techniques are described for obtaining at least one image using at least one processor. The techniques may include selecting a plurality of objects defined by a plurality of pixels within the at least one image. The techniques may include determining perceptual information associated with each of the plurality of objects and generating a context for each of the plurality of pixels that define the plurality of objects. The techniques may also include automatically thresholding the at least one image to generate an output image that represents the at least one image.

17 Claims, 7 Drawing Sheets

CONTENT AWARE, SPATIALLY ADAPTIVE AUTOMATED THRESHOLDING OF IMAGES

TECHNICAL FIELD

This description relates to image processing.

BACKGROUND

As corporations and consumers become more computerized, it is becoming common to scan paper documents to store and maintain electronic versions of the documents on computer systems. The scanning may include various document analysis and imaging techniques to accurately convert the text and imagery on the paper document into the electronic version of the same document. One example technique may include document binarization (also referred to as document thresholding).

Document binarization may be used as a tool to analyze document content for purposes of scanning, copying, and/or otherwise reproducing content in an electronic format. Document binarization may include converting content within a document into one or more binary image. The quality of the outputted document undergoing document binarization can vary based on computing software settings, hardware capability, and the initial quality of a document.

The task of binarization of images may include configuring several tuning parameters to be applied to particular portions of the document and/or imagery in the document. The tuning parameters can be modified by a user based on the state of a particular input image to improve one or more aspects of the image. Configuration of tuning parameters is typically performed through many trial and error selections and iterations of binarization steps.

The quality of such scanned images can vary based on the tuning factors and the complexity of the content in the document. There exists a need for a method and apparatus to improve the quality and speed of binarization of documents that are degraded without the delay and multiple binarization iterations.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method for adaptively thresholding image pixels is described. The method may include obtaining at least one image using at least one processor and selecting, using the at least one processor, a plurality of objects defined by a plurality of pixels within the at least one image. The method may also include determining, using the at least one processor, perceptual information associated with each of the plurality of objects and generating, using the perceptual information, a context for each of the plurality of pixels that define the plurality of objects. The method may further include automatically thresholding, using the context for each respective pixel, the at least one image to generate an output image that represents the at least one image. The output image may be a binarized version of the at least one image. Other embodiments of this aspect may include corresponding computer systems, apparatus, and computer programs recorded on one or more computer storage devices, each configured to perform the actions of the methods.

Implementations may include one or more of the following features. In some implementations, the context may be based on the perceptual information associated with at least one of the plurality of objects. For example, the perceptual information may include a color variance associated with at least one of the plurality of objects. In some implementations, the context indicates whether a respective pixel is represented in black or white in the output image. In some implementations, generating a context includes generating a saliency map (e.g., contextual data) to represent the at least one image. The saliency map may be based at least in part on the perceptual information associated with at least one of the plurality of objects. In some implementations, the method may further include performing a nearest neighbor estimation using the saliency map (and/or contextual data). The nearest neighbor estimation may, for example, include defining a minimum size to a neighborhood used in the nearest neighbor estimation, defining a maximum size to the neighborhood used in the nearest neighbor estimation, estimating, for each pixel in the saliency map, at least one neighbor pixel, and calculating a maximized variance for a plurality of pixels located within the defined minimum size and the defined maximum size. The nearest neighbor estimation may further include binarizing each pixel in the at least one image according to the respective estimation for each pixel. The binarization may generate the output image being corrected for degraded image content in the at least one image. In some implementations, the thresholding is spatially adaptable based on the defined minimum size of the neighborhood and the defined maximum size of the neighborhood. In some implementations, the automatic thresholding is performed on an embedded computing device. Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIGS. 5A-5C illustrate another example of using contextual information to generate an image, using the system of FIG. 1.

DETAILED DESCRIPTION

Figure 1:
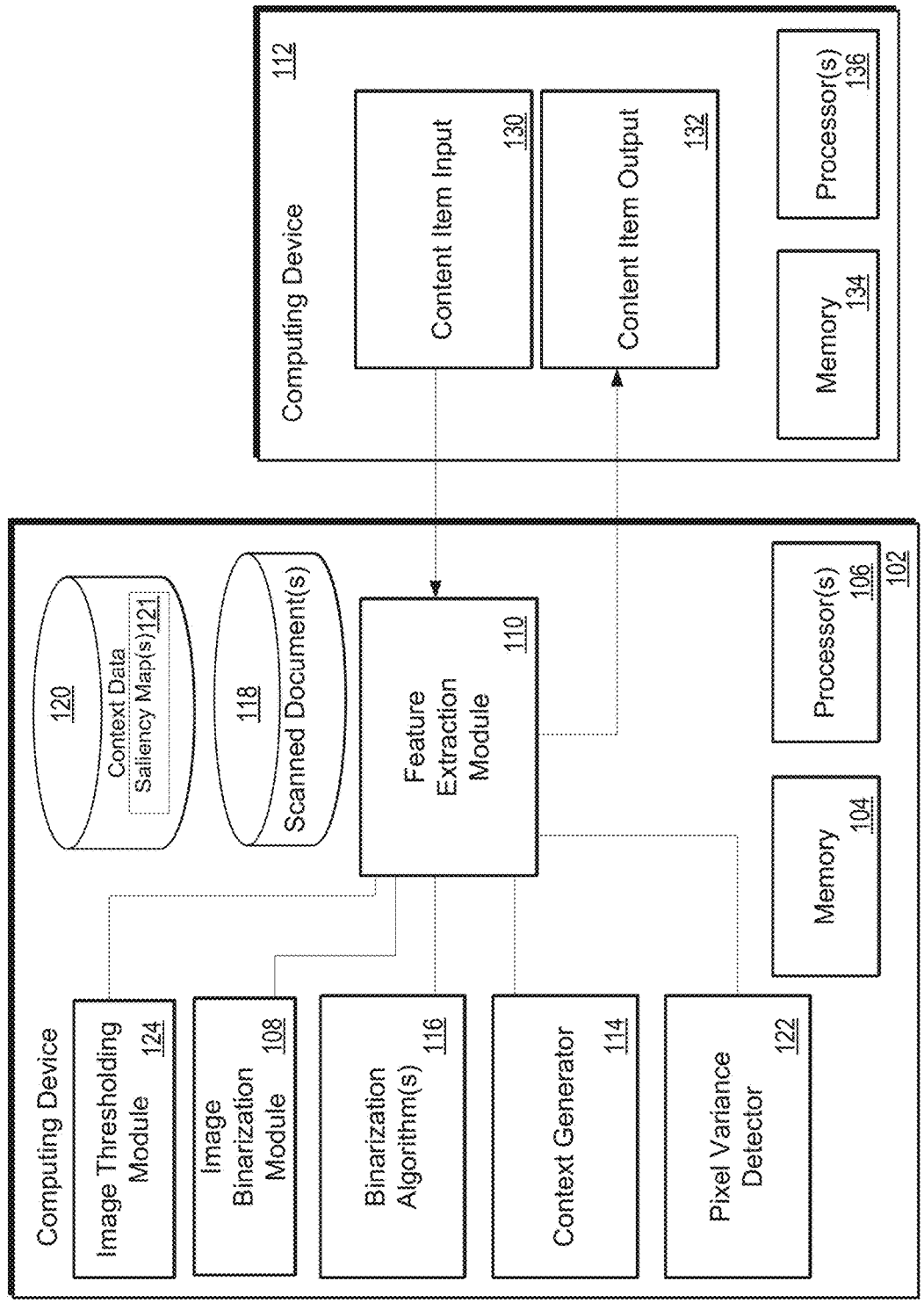
FIG. 1 is a block diagram of a system for performing content aware, spatially adaptive automated image thresholding, according to an implementation.

This document describes systems and techniques that provide for content aware, spatially adaptive and automated thresholding of content. Such systems and techniques may be used to perform content-based thresholding to enhance images within the content. The content-based thresholding may include, among other things, determining which particular portions of the content may be perceived as noticeable with respect to other portions of the content. This perceived noticeability may provide perceptual information that can be used to generate a context for the content (e.g., images, content items within the content, etc.). For example, the perceptual information can be used to generate a context for the content.

In some implementations, the perceptual context may be used to determine relevance of a particular pixel in a binary output. The perceptual context can also be used to decide how the pixel blends with other pixels within a defined neighborhood of pixels (e.g., predefined area size). Thus, perceptual context can be used to derive other contextual information which may collaboratively indicate whether a pixel should be represented as black or white, for example.

In some implementations, the context may be used to generate a black and white saliency map for the content. For example, the context may provide a way to indicate whether a pixel in the saliency map should be represented by black color or white color. In some implementations, the saliency map may provide the context for thresholding the content (e.g., images).

In some implementations, perceptual information may pertain to a determined noticeability of one portion of an image over another portion of the image. For example, an icon image depicted in content may be more noticeable to a user than small text in the same content. Portions of the content that are perceived as noticeable may be binarized and/or thresholded using different algorithms than other portions of the content deemed as less noticeable. Using multiple algorithms to threshold a single content item (e.g., image, document, etc.) may provide an advantage of selectively performing improvements on portions of the content item that may be deemed important to a user, while saving time and processing resources for other portions of the content item deemed less important to the user. Time and processing resources are saved, for example, because the systems and methods described herein may provide a mechanism to perform thresholding tasks in an automated fashion.

In some implementations, the perceived noticeability of particular content may be used to generate one or more specific contexts with which to threshold the content. For example, a saliency map may be generated to provide context for the content. The saliency map may indicate meaningful content and less meaningful content on a scale using black, white, and gray to denote meaning, for example. The colors in the saliency map may provide the context used to perform image thresholding processes to improve degraded content (e.g., low resolution documents). For example, a portion of gray background may be deemed less important than a portion of text in an image. Accordingly, the systems and methods described herein can ensure that a context indicating importance is provided for the image. The context can be used to colorize pixels in the thresholded images. In some implementations, the context can be used to derive implicit context such as correlation between pixels within a same neighborhood of pixels.

In some implementations, the systems and methods described herein can determine a context for each pixel in the image. The color, content, and/or luminance represented by a pixel as well as properties of pixels surrounding the pixel may be used to determine the context for the pixel. In some implementations, automated thresholding of content items (e.g., images and content within documents, emails, pamphlets, web pages, posters, presentation slides, etc.) may be performed based on one or more determined contexts pertaining to the content.

In some implementations, content-aware and spatially adaptive thresholding may be performed based on perceptual information (e.g., saliency and derivative of saliency) determined to be associated with content items (e.g., images). The content awareness may pertain to determining areas within an image that are noticeable to a user. The spatially adaptive thresholding may pertain to the ability of the systems, methods, and techniques described herein to use variable-sized selections of image content (e.g., elements) in which to analyze, build context, and threshold. For example, based on the pixel properties the systems and methods described herein can dynamically decide a size of a neighborhood to be used for building the context.

The systems, methods, and techniques described herein can use the perceptual information to build context into a thresholding process. Thresholding may be automated based on the context of the content. For example, a large variance in color values between pixels may provide perceptual information (e.g., saliency information) that indicates one color may include content and/or elements in the images that are important to perception of the document and another color may include content and/or elements that are less important to perception of the document.

In some implementations, an automated image thresholding process may include, among other things, utilizing perceptual data (e.g., saliency data) (for content items) to model a perceived noticeability of particular object within images of content items. The methods and systems described herein may utilize the perceived noticeability to carry out adaptive thresholding on a content item (e.g., a digital document). The adaptive thresholding may improve a visual quality associated with such documents. For example, the luminescence in an image can be used to determine a noticeability level of particular objects with regard to all objects in the image. The level can be used to precisely threshold the areas surrounding the particular objects using the noticeability level as a contextual guide to recreate portions of the objects (in a document) that may be perceived as meaningful to a user, for example. In some implementations, context built from the perceptual data (e.g., saliency data) can be used to determine how to modify settings for performing thresholding operations that improve a degraded digital content item (e.g., document), for example.

Contextual data, as used herein, may be defined as a visual quality of an object in an image to be perceptually noticeable (e.g., based on perceptual information). For example, contextual data may be based on eye gaze data. In some implementations, eye gaze data represents data that measures how much a particular element actually stood out relative to its neighbors to a human viewer. Perceptual information, as used herein, may be defined as information that describes a predisposition to perceive objects and/or pixels within image content in a certain manner. The information may describe and/or define how a human being would visually perceive the objects and/or pixels in the image content. In some implementations, the information may pertain to object and/or pixel weight, pixel color, number of pixels, object size, pixel luminance, pixel brightness, and/or pixel darkness, just to name a few examples.

The techniques described in this document for extracting perceptual information and/or context can be used to compute and identify locations and visual structures (e.g., objects) in content. The locations and objects may be selected because they stand out from other locations or objects within the content. That is, locations or objects may be deemed meaningful, for example, if the location or objects are more noticeable and/or recognizable than other locations, objects, and/or aspects within the same content (e.g., image).

In some implementations, the systems, methods, and techniques described in this document may utilize a relative visual noticeability of objects in a particular image (e.g., document) to derive context for adaptive thresholding. Using this context, one or more contexts (e.g., saliency maps) of the image (e.g., document) can be generated. Content-based thresholding may be performed using the saliency maps and the context that may be gleaned from the content. Such a context, in this example, may be calculated for each pixel in the image. Since the context may be based on information that is calculated for each pixel separately, this approach may provide an advantage of selecting particular portions of a degraded document in which to focus thresholding upon.

As used herein, a saliency map may be defined as a topographical image that depicts visual quality for each pixel in an image. For example, a saliency map may depict each pixel from an image with respect to other pixels in an image. The saliency map may be used to simplify and/or otherwise modify an image to be represented in another way. For example, a saliency map may be used to threshold and or binarize an image into an image that may be easier (i.e., less processing intensive) than the original image. In some implementations, a saliency map may be used as an input to control diversion or attraction of attention of a user.

As used herein, binarization may be defined as a process of converting a pixel image to a binary image. Binarization may be accomplished using any number of thresholding techniques. A binarized version of an image may pertain to generating a black and white image from a non-black and white image.

As used here, thresholding may be defined as a method in which to segment an image by setting all pixels having intensity values above a predefined threshold to a foreground value (e.g., color) and setting all remaining pixels to a background value (e.g., color). In some implementations, thresholding may result in binarizing an image into black and white coloring.

As used herein, adaptive thresholding may be defined as changing the predefined threshold to be a variable (i.e., adaptive) threshold. The variable threshold can be used to dynamically change the threshold value as the image is thresholded. For example, for each pixel in an image, a pixel value may be calculated. If the pixel value is below the threshold, the pixel may be set to a background value. If the pixel value is above the threshold or at the threshold, the pixel is set to the foreground value.

As used herein, noticeability may be defined as a propensity of a pixel (or object) to attract attention (or notice of a human eye gaze) with respect to other pixels (or objects) in a digital image.

As used herein, a content item (i.e., digital content item) refers to one or more files that have at least one text-based element used to convey information to a reader. Example content items can include documents, emails, pamphlets, web pages, posters, presentation slides, and the like. Content may refer to the text, images, and other information that make up the content item. A content element, or just element, is any object on which a content creator can take action. Examples of an element include a title, a heading, an image, a paragraph, a table, a text box, a button, a link, a span, etc. Some elements may correspond to objects in a document object model (DOM). A document object model represents a tree data structure for content items in a mark-up language format where each node in the tree represents a part of the markup-based content designated by a markup tag. Natural images refer to images that do not generally include text and instead include images of places, people, and objects. For example, an image that is at least fifty percent text may represent content, while an image with less than fifty percent text represents may represent a natural image.

The systems and methods described herein can provide an advantage of automating adaptive document thresholding. For example, adaptive thresholding (and binarizing) of documents may not include selection and manipulation of tuning parameters, as performed in prior art systems. Instead, the systems and methods described herein may receive an input image and collect data about the image to automate the thresholding process while providing an improved version of one or more aspects of the image. The systems and methods described herein may vary particular parameters based on aspects gleaned from the image instead of requesting trial and error selections and iterative thresholding steps. In short, the systems and methods described herein may auto-tune particular thresholding settings that may be applied to an image.

Because the aspects are machine-analyzed, the thresholding settings to improve such aspects can be machine-selected without user intervention to provide an improved version of the image. In addition, because the aspects are machine-analyzed and the settings are machine-selected without user input, producing an improved version of the image is performed faster than conventional adaptive image thresholding.

FIG. 1 is a block diagram of a system 100 for performing content aware, spatially adaptive automated image thresholding, according to an implementation. The system 100 includes a computing device 102 having at least one memory 104, at least one processor 106, and one or more modules, such as image binarization module 108, image feature extraction module 110, and image thresholding module 124. The computing device 102 may communicate with one or more other computing devices, e.g., computing device 112 over a network (not shown). The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network or plurality of networks.

In some implementations, the computing device 102 is a client device while the computing device 112 is a scanner that is connected to device 102. Device 102 may be communicably coupled to device 112 via wireless, wired, or other networked connection. In some implementations, the computing device 102 is a server device while computing device 112 is a client device computer that provides documents (e.g., content item input 130) to device 102.

The processor 106 may represent two or more processors on the computing device 102 executing in parallel and utilizing corresponding instructions stored using memory 104. In some implementations, the at least one processor 106 may be a specialized processor, e.g. a graphics processing unit (GPU). The memory 104 represents a non-transitory computer-readable storage medium. Similarly, the memory 104 may represent one or more different types of memory utilized by the computing device 102. In addition to storing instructions, which allow the at least one processor 106 to implement disclosed embodiments, the 104 may be used to store data, such as context data 120 for one or more pixels, binarization algorithms 116, scanned documents 118, and/or context data 120 (e.g., saliency maps 121). The memory 104 may also be used to store processes and modules, such as image binarization module 108, context generator 114, pixel variance detector 122, etc., and related components.

The feature extraction module 110 may utilize the pixel variance detector 122 to generate one or more context data 120 (e.g., saliency maps 121) and/or zoom levels for particular elements in the content. Each zoom level may represent a level of context for the element. A highest zoom level may depict the element. This zoom level represents low context for the element because it does not include any, or very little, context information from the content outside of the element itself. A lowest zoom level may represent the content item. This represents high context for the element, as it includes all or almost all content from the content item.

Figure 2:
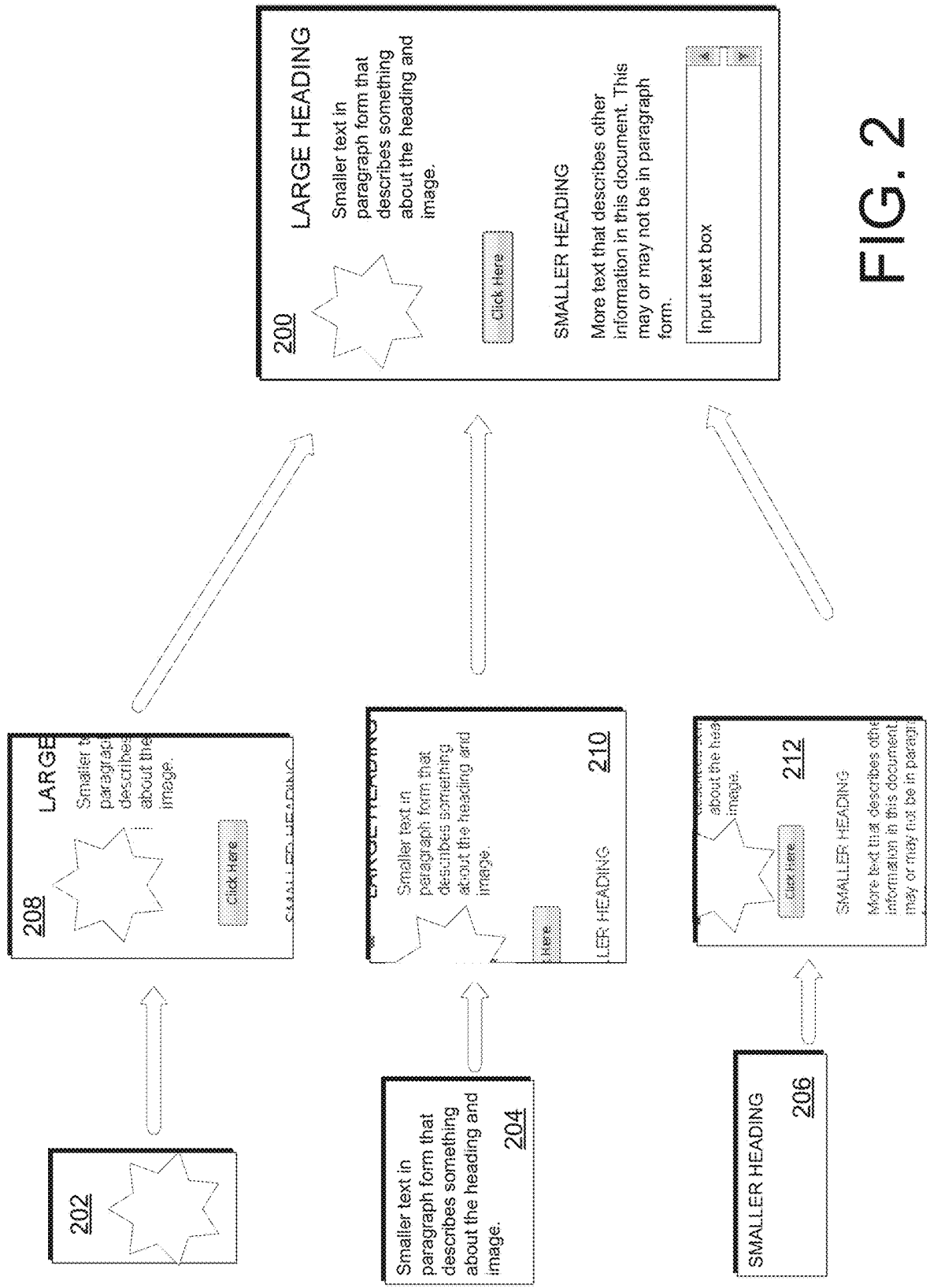
FIG. 2 is an illustration of example elements that may be included in a content item.

In some implementations, the feature extraction module 110 may generate one or more intermediate zoom levels. This represents intermediate context for the element, as it includes some content outside the element itself but less than all or almost all content from the content item. For example, one intermediate zoom level may represent an area that is half-way between the element itself and the edge of the content item. This resolution may be determined by a half-way point on each side of a bounding box (e.g., rectangle) for the element. A bounding box is the smallest shape, (e.g., a rectangular box) that encloses the entire element. FIG. 2 illustrates the different zoom levels for three elements in informational content item 200. The element 202 is a highest zoom level, representing the element itself. Intermediate resolution 208 represents an intermediate zoom level for element 202, and the full content item 200 represents a lowest zoom level for element 202. Similarly, element 204 has a highest zoom level that is the element 204 itself, an intermediate resolution of 210, and a lowest zoom level represented by content item 200. In general, as the zoom level decreases, more context information is included.

In some implementations, the feature extraction module 110 may use the pixel variance detector 122 and context generator 114 to generate context data 120 (e.g., saliency map 121) that can be used to generate content item output 132. For example, the feature extraction module 110 may receive or obtain a content item (e.g., content item input 130) from a content creator, e.g., using computing device 112. The context generator 114 may identify elements in the content that may be noticeable (with respect to other elements in the content) and compute and/or generate context data 120. Identifying elements in the content may include use of feature extraction module 110, pixel variance detector 122, image binarization module 108, and/or algorithms 116.

Identification of elements in the content may provide a mechanism in which to generate a context for the content. Using relative perceptual information for each object and/or pixel within the content (e.g., image) can provide a measurable variance between objects and/or pixels with in the content. This variance can be used to assign contextual ques that may be meaningful to a user. For example, if an image includes a heading, a photo, and text, a contextual que that may be useful for the user may include the photo, as it may capture the attention of the user before the heading and text. If a level of context is determined for particular objects and/or pixels in an image, the systems and methods described herein can carry out quality thresholding to provide content item output that is legible, clear, and adapted to provide a crisp reproduction of meaningful (based on the determined contexts) information for the user.

The image thresholding module 124 may utilize the determined contexts associated with images (e.g., content) received at one or more computing system described herein. Using contextual information associated with images of degraded documents, for example, can provide advantages over systems that utilize manual adjustment of document parameters while performing image thresholding. For example, if a particular context is determined for each pixel in an image, portions of the image that pertain to the determined context may be reproduced using a first binarization algorithm while the other portions of the image are produced with a second and different binarization algorithm 116.

One example advantage of utilizing contextual information associated with images may include providing output that is derived from perceptual information of the image. That is, determining one or more objects that are more visible than another object may provide a context cue that the more visible object in the image may be given more relevance in the binary output generated by the binarization process. This can ensure that a quality of the threshold output is maintained at meaningful portions of the image.

In some implementations, the thresholding of content described herein may provide clear and concise outputted images regardless of varying luminosity throughout the images. Such thresholding may be performed automatically and without user adjustments and/or intervention. The thresholding techniques may be used within embedded devices because such techniques are not computationally intense and can be performed without user input.

The computing device 112 may include content item input 130 and content item output 132. The computing device 112 may utilize memory 134 and processors 136 to carry out operations using the systems, methods, and techniques described herein. Content item input 130 may include content items having text, such as a document, an email, a web page, a pamphlet, a poster, etc. In some implementations, the content item may be HTML-based, PDF-based, image-based, rich text based, etc. Content items may be created in an HTML editor, a word processing program, a presentation program, a PDF program, an image editing program, a spreadsheet program, or the like. In general, content item input 130 may include any of the above type of content that may be used as an input to a scanner, for example. The scanner may take the content item input 130 and generate content item output 132 using the systems, methods, and techniques described herein. In some implementations, content item input 130 may be stored as scanned documents 118.

Each content item input 130 may include any number of elements. An element is any object on which the content creator can take action. Examples of elements include a title, a heading, an image, a paragraph, a table, a text box, a button, a link, a span, etc. In some implementations, the elements may be defined by a user, e.g., by tagging or a GUI-based selection. For example, a GUI (graphical user interface) may enable a content creator to designate an element by drawing a box or other shape around the element. In some implementations, the feature extraction module 110 may automatically detect the elements, e.g., using a document object model (DOM) tree for the content item. A DOM tree is associated with markup based content, such as HTML, and each node in the tree represents a part of the markup-based content designated by a markup tag. In some implementations, the feature extraction module 110 may communicate with and use a component of the context generator 114, which determines elements of content item input and generates saliency maps and/or context data for such elements. The context data (e.g., saliency maps) can be used to provide particular context for the content (and elements in the content).

The process of generating saliency maps may include generating smoothened images of content item input 130 (e.g., an image) and converting the image to LAB color space. Lab color space utilizes a three axis system to communicate different colors across different devices, for example. In this example a first axis includes an L-channel (e.g., Lightness channel) which uses white to black across a first axis, an A axis which uses cyan to magenta/red across a second axis, and a B axis which uses blue to yellow across a third axis. The process of generating saliency maps may also include finding a channel means based on the LAB image and generating a normalized saliency map. From the normalized saliency map, an enhanced saliency image can be generated as content item output 132. Additional details for generating saliency maps are discussed below. In some implementations, segmentation can be performed on content to determine and separate foreground pixels from background pixels, for example.

FIG. 2 is an illustration of example elements 202, 204, 206 that may be included in a content item 200. FIG. 2 also illustrates a number of various zoom levels, also referred to as resolutions, used to generate one or more pixel-level features that can be used to derive context to be used in adaptive thresholding. In the example of FIG. 2, the system 100 may generate a saliency map of content item 200. To generate such a map, the system 100 may analyze elements 202, 204, and 206, for example to determine pixels that provide saliency. The elements 202, 204, and 206 may be smoothened (and/or zoomed) to determine particular context for one or more pixels.

In general, the saliency map recreates a layout of a content item but with the area corresponding to each element replaced with a bounding box having a coloration that is dependent on the level of saliency for the element. In other words, each element is replaced with a shape that has an appearance that corresponds with the level (e.g., amount) of saliency for the element with respect to other elements in the content item (e.g., image). For example, elements with a high level of saliency may be white, while elements with a low level of saliency may be dark gray, and elements with a medium level of saliency may be light gray. Other variations in color may also be used, including different patterns, shapes, color gradients, etc. may be used.

As shown in FIG. 2, elements 208, 210, and 212 represent an intermediate resolution for an area surrounding particular elements in the image 200. In the example of FIG. 2, intermediate resolution 208 includes element 202 and pixels corresponding to an area immediately surrounding element 202. In the example of FIG. 2, the area immediately surrounding element 202 is determined by locating a point mid-way between each edge of element 202 and the corresponding edge in the content item 200. Similarly, intermediate resolution 210 corresponds to the area immediately surrounding element 204 and intermediate resolution 212 corresponds to the area immediately surrounding element 206. The other elements of the content item 200 would also have corresponding intermediate resolutions. The generated saliency maps using the content items may correspond to the intermediate resolution for an element.

Figure 3:
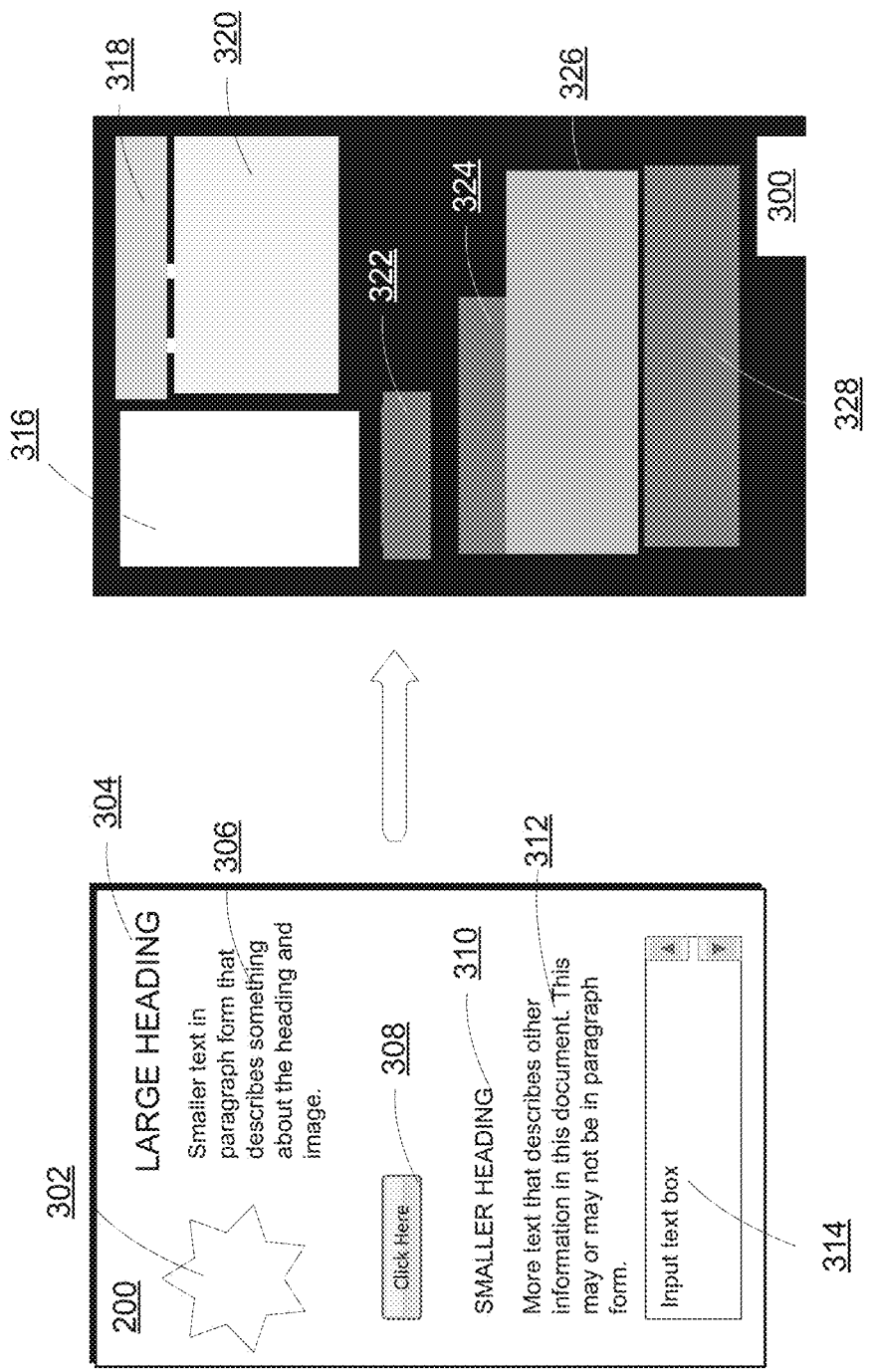
FIG. 3 illustrates an example saliency map of the content shown in FIG. 2.

FIG. 3 illustrates an example saliency map 300 generated for the informational content item 200, according to one example. In the example of FIG. 3, the content item 200 includes eight different elements. Accordingly, the saliency map 300 includes eight element areas, each area corresponding to one of the elements. The element areas of the saliency map 300 are laid out based on the location of the corresponding element in the original content item 200. The element areas include a screen element (e.g., image 200) representing the user interface background, an element 302, a large heading element 304, a text element 306, a button element 308, a small heading element 310, a text element 312, and an input box element 314.

The corresponding layout shown in saliency map 300 provides a quick visual correspondence between the areas 316-328 and the original content items 300-314. Each element area in the saliency map has a coloration that corresponds to a context assigned using the techniques described herein. In the example of FIG. 3, a lighter coloration corresponds to a higher saliency (e.g., context) for the element. For example, the element area 316 that corresponds to element 302 in content item 200 is white, indicating this element is most prominent to readers. In contrast, element areas 322, 324, and 328, which correspond to elements 308, 310, and 328 respectively, have dark coloration, indicating a reader is not likely to pay much attention to these elements in the first n seconds of viewing. If the content creator of content item 200 wishes to make element 302 more prominent than elements 308, 310, and 328, then the layout is good. However, if the content creator wishes instead to have element 322 to be more prominent, the content creator can play with the arrangement, size, and appearance of the elements to ensure that element 322 increases in saliency.

In some implementations, a saliency map may be generated using a the example steps shown below. In one example, content item input 130 (e.g., an image) may be received and/or obtained. From the content item input 130, the feature extraction module 110 can extract a number of features and smoothened out the content item input 130. For example, a chain of smoothening filters may be applied to the input 130. In one example, a pyramid-ical mean shift filtering may be applied to the input 130. This can cause a background texture to be flattened. To further reduce variance in the input 130, the output of the filtering may undergo at least one smoothing filter to preserve edges of the input 130. The following example equation may be used to smooth the input 130:

$$I_{smooth} = f_{smoothening}(f_{PyramidicalMeanShift}(I_{input})) \quad (1)$$

Next, the input 130 and smoothened image output from equation (1) may be converted to LAB color space using equations (2) and (3), for example:

$$I_{LAB_{Input}} = g_{LAB}(I_{Input}) \quad (2)$$

$$I_{LAB_{Smooth}} = g_{LAB}(I_{Smooth}) \quad (3)$$

Next, the context generator 114 can find a channel means on input 130. A mean for each channel in the smoothened LAB image (e.g., from equation (3) is calculated using equation (4):

$$\text{Mean}[i]_{i:1 \text{ to } 3} = \frac{\Sigma_{all\ pixels} |I_{LAB_{Input}}[i]|}{Num_{Pixels}} \quad (4)$$

Next, the context generator 114 may generate a normalized saliency map (e.g., a saliency map image) by computing a Euclidean distance for each pixel in the smoothened LAB image with the mean values computed above. The image generated is then normalized for values in range of zero-255.

$$I_{SaliencyMap} = \Sigma_{i=1}^{3}(I_{LAB_{Smooth}}[i] - \text{Mean}[i])^2 \quad (5)$$

$$I_{Saliency} = \text{Normalize}_0^{255}(I_{SaliencyMap}) \quad (6)$$

The saliency image from equation (6) above may be enhanced. For example, the saliency image generated using equation (6) may be enhanced by a histogram based contrast enhancement technique. The enhanced image generated using equation (7) represents context data 120 (e.g., a saliency map 121) for the content item input 130. The saliency map/image may be stored in and later retrieved from repository of context data 120, for example.

$$I_{Saliency_{Enhanced}} = \text{Enhance}(I_{Saliency}) \quad (7)$$

Once a context is determined for particular features in a content item, the image thresholding module 124 may perform a rectangular neighborhood estimation. For example, for each pixel in the saliency image, a neighbor pixel may be estimated (e.g., using nearest neighborhood estimation). In one example, the nearest neighborhood estimation can be performed using the bounding rectangle described above.

As used herein, a neighborhood may be defined as a size of a bounding box used in a nearest neighbor estimate, as described herein. In some implementations, the neighborhood is defined based on a number of characters of text (depicted by pixels in an electronic document) that may fit in the box. In general, the nearest neighbor estimate is inversely proportional to a size of the box (e.g., neighborhood) used to contain a given number of pixels.

In some implementations, a minimum and a maximum size of a neighborhood may be configured. For example, a minimum and a maximum size of a neighborhood (e.g., bounding rectangle) may include 51 by 51 pixels as a minimum size and 101 by 101 pixels as a maximum size. In this example, the size of the rectangle is selected based on a rule indicating inclusion of at least two characters printed in a document. Exact neighborhood rectangular estimation may be computed in such a way that it maximizes the variance within the given size ranges.

In general, a variable-sized bounding box that maximizes a variance in the content in an image may be computed for each pixel in a saliency map. A mean value within the bounding rectangle may then be used for comparison when binarizing is carried out for each particular pixel.

Next, the image thresholding module 124 may perform thresholding of the processed saliency image. For example, for each pixel in the saliency image, a mean is calculated in its rectangular neighborhood. This mean is then used as the comparison value for binarizing that particular pixel, as shown in equation (8):

$$I_{Output}[i \cdot j] = \begin{cases} 1, & \text{if } I_{Saliency_{Enhanced}}[i,j] > \mu_{i,j} + k \\ 0, & \text{if } I_{Saliency_{Enhanced}}[i,j] \leq \mu_{i,j} + k \end{cases} \quad (8)$$

where 'i' and are pixel coordinates, 'μ' is the mean for that pixel in its neighborhood and 'k' is a constant. In some implementations, a value for 'k' is decided by using the size of neighborhood. A nearest neighborhood estimation may be performed to adapt an amount of smoothing of a group of pixels to a local density of data. A degree of smoothing may be controlled by a selected constant 'k' that is considerably smaller than the sample size of pixels. For example, if the sample size is n pixels, the selected constant 'k' may be the square root of n. In general, the nearest neighbor estimate is inversely proportional to a size of the box (e.g., neighborhood) used to contain a given number of pixels.

In some implementations, the image thresholding module 124 uses the rectangular neighborhood to determine a variance in color in pixels within the rectangle. For example, an edge of a character may have several pixels that differ in color than bordering pixels surrounding the character. The variance in color may be a perceptible feature in the image (i.e., it may be perceptible to view how the character color varies from the color surrounding pixels around the character). In another example, a brightness of particular pixels may be a perceptible feature and thus may be used as a basis for automatically thresholding a particular image.

Figure 4A:
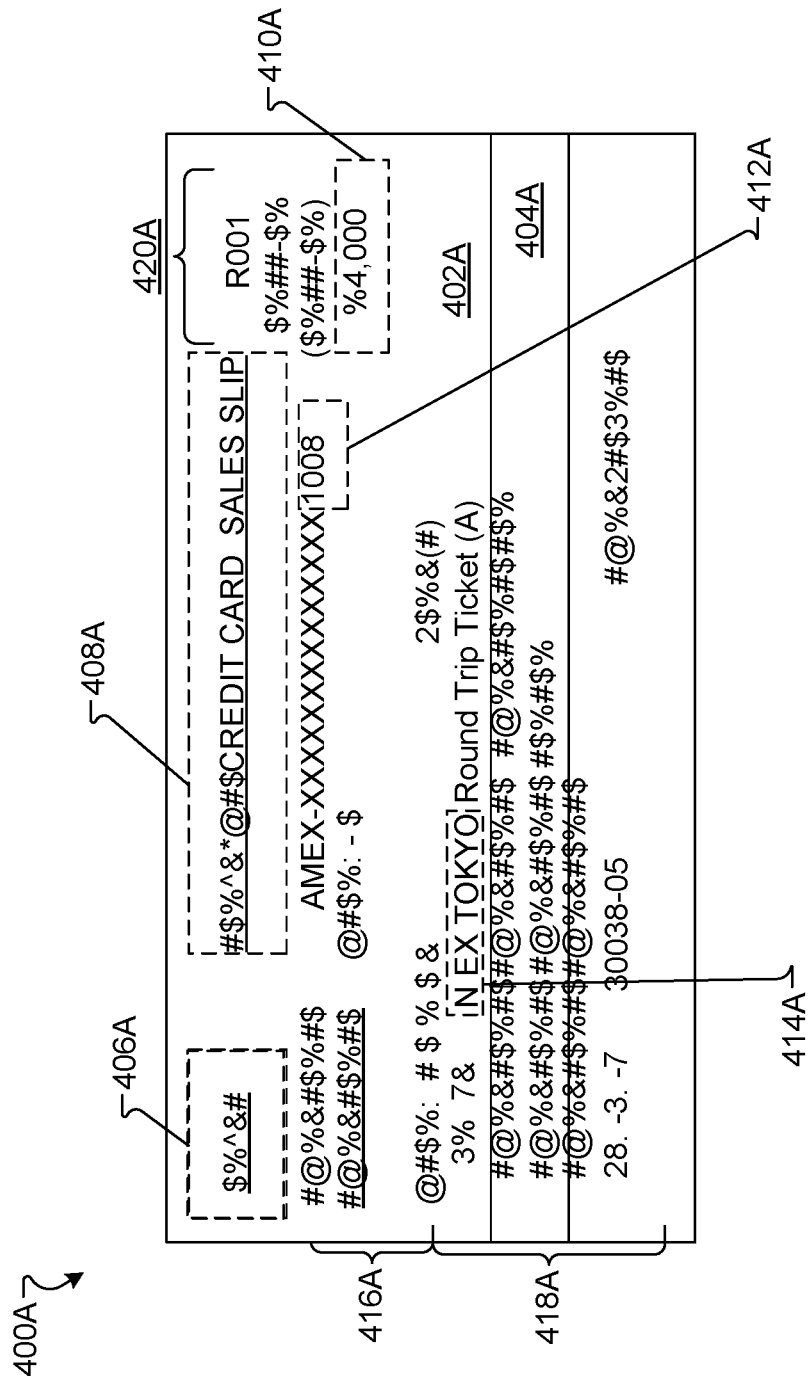
FIGS. 4A-4C illustrate an example of using contextual information to generate an image, using the system of FIG. 1
Figure 4B:
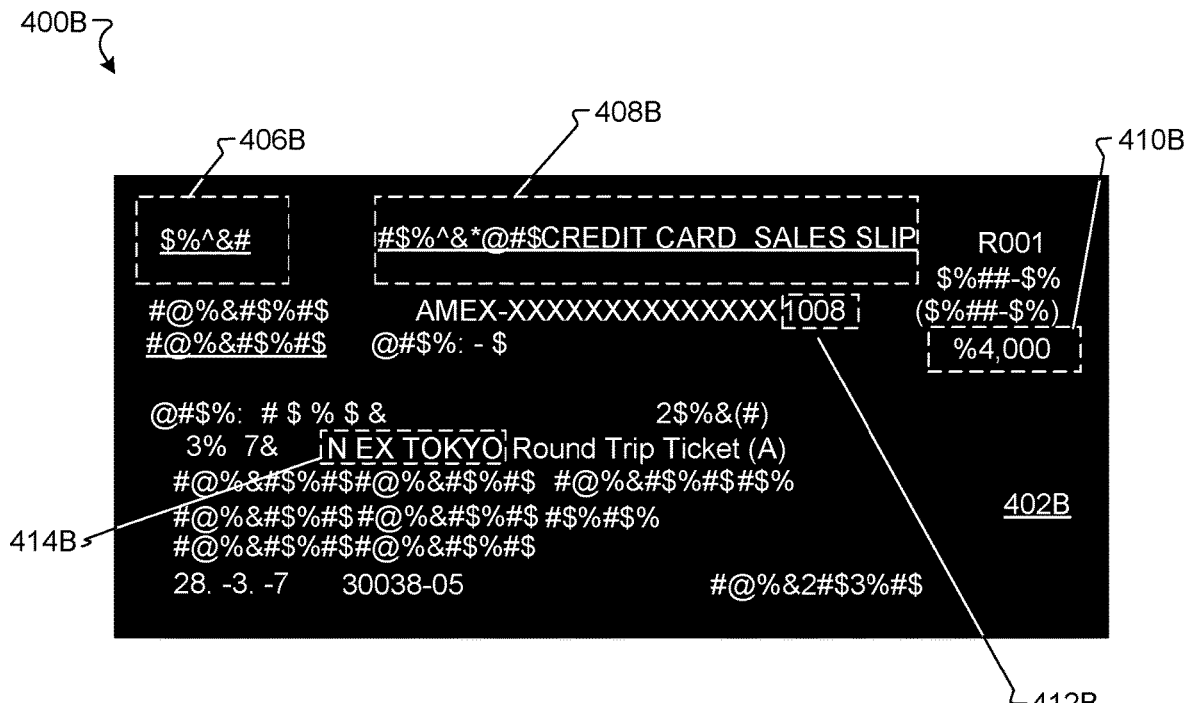
Figure 4C:
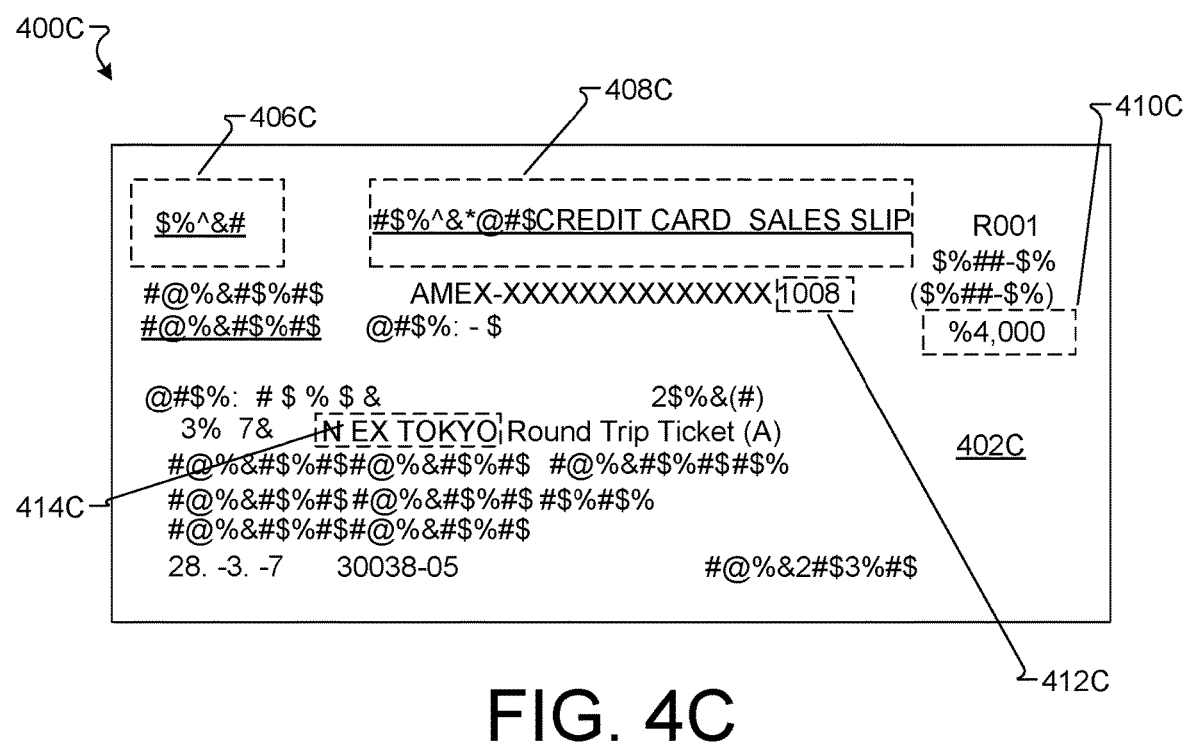

FIGS. 4A-4C illustrate examples of using contextual information to generate an image, using the system of FIG. 1. Referring to FIG. 4A, an example content item input (image) 400A is shown. The image 400A is a credit card sales slip for a ticket to Tokyo, Japan. Image 400A may have been provided to system 100 via a computing device, scanner, printer, etc. Image 400A is an image that includes a background area 402A that is slightly degraded and background area 404A that is further degraded. Image 400A includes several areas 406A, 408A, 410A, 412A, 414A that may be automatically deemed as noticeable with respect to other portions of the content (e.g., portions 416A, 418A, 420A, etc. In this example, the system 100 may have determined a relative visual noticeability of objects (e.g., elements) in the image 400A (e.g., content item input 130).

As shown in FIG. 4A, the system 100 selected elements 406A, 408A, 410A, 412A, and 414A as noticeable elements. For example, element 406A may have been selected based on the placement in the image. That is, a reader would be likely to read from left to right (or top to bottom) of a document. Accordingly, the system 100 selected a topmost and left most portion of the image 400A to be deemed noticeable. In the example of element 410A, a user may gaze at a price (e.g., a number) that is in larger font than other elements in the image 400A. In the example of element 414A, a destination associated with the ticket shown in image 400A may be automatically deduced as having important context for a user and as such has been deemed as noticeable over other elements in the image 400A.

Elements 416A, 418A, and 420A may be deemed less noticeable or less important to a user. Thus, system 100 may choose to use a different technique (than the technique used on elements 402A-414A) to perform thresholding of image 400A.

After assigning a noticeability to elements, the system 100 (e.g., feature extraction module 110, context generator 114, and/or pixel variance detector 122) can be used to generate a context for the image 400A that can be used to carry out image binarization and thresholding on the image 400A. For example, the context generator 114 may automatically determine pixel noticeability, assign a saliency level, and generate a saliency map 400B (as shown in FIG. 4B) based on the saliency level(s).

Referring to FIG. 4B, a saliency map 400B is shown for image 400A Here, the background 402A and 404A have been deemed less meaningful and have been turned black, as shown at background 402B. Similarly, element 406A, 408A, 410A, 412A, and 414A have been made bright white to indicate noticeable and meaningful elements 406B, 408B, 410B, 412B, and 414B.

In some implementations, the saliency map 400B may be generated using any number of saliency map algorithms. One example algorithm may include using image 400A and generating smoothened images, converting the smoothened images to LAB color space, determining a channel means on the LAB color space image, generating a normalized saliency map, and enhancing the normalized saliency image.

Upon completing the saliency map (e.g., the saliency image 400B), the image binarization module 108 may carry out a number of rectangular neighborhood estimations. In particular, module 108 may estimate a neighbor for each pixel in a context image (e.g., saliency map). For example, the image binarization module 108 may determine a minimum and a maximum neighborhood size (e.g., box). For instance, a minimum sized box may be 51 by 51 pixels and a maximum sized box may be 101 by 101 pixels. Such measurements may pertain to enclosing at least two characters printed on a typical typed document. In some implementations, a minimum sized box may be 26 by 40 pixels while a maximum sized box may be 51 pixels by 75 pixels. Other variations in neighborhood box size are possible. The neighborhood rectangular box is applied to the image to compute and maximize a variance within the selected box size. Maximizing the variance pertains to maximizing a variability between pixels within the box.

For each pixel in the saliency image (e.g., the saliency map image 400B), the image thresholding module 124 can calculate a mean in the rectangular neighborhood for the respective pixel. The mean value of the rectangular neighborhood box is then used as the comparison value for binarizing that particular pixel. The binarized pixels are used to generate the content item output 400C. The content item output 400C includes an improved image of image 400A. In particular, output 400C includes an improved background 402C with enhanced text elements at 406C, 408C, 410C, 412C, and 414C.

Figure 5A:
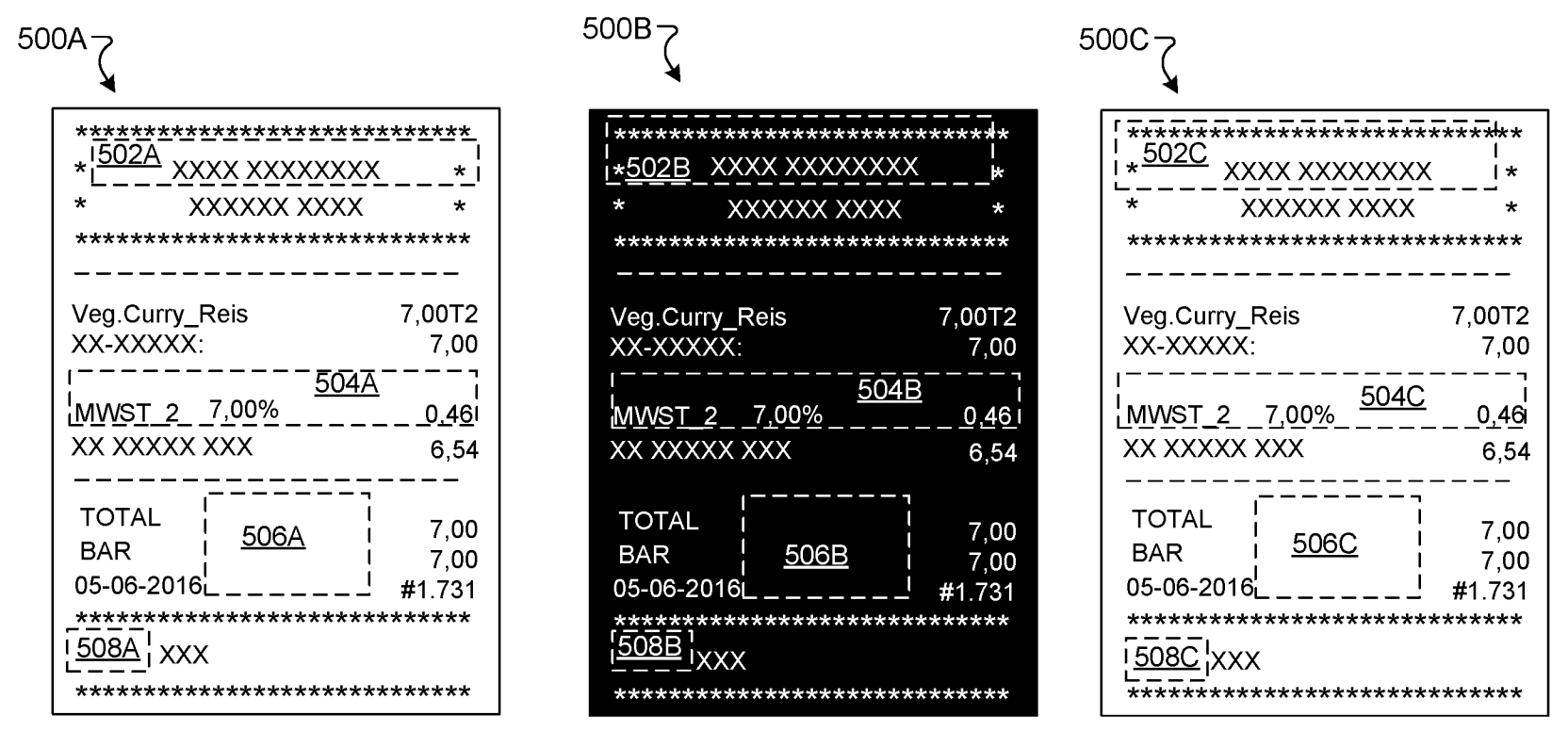

FIGS. 5A-5C illustrate another example of using contextual information to generate an image, using the system of FIG. 1. Referring to FIG. 5A, an example content item input (image) 500A is shown. The image 500A is a receipt for food purchased at a restaurant. Image 500A may have been provided to system 100 via a computing device, scanner, printer, etc. Image 500A is an image that includes a background area that is slightly degraded. In particular, image 500A includes several areas 502A, 504A, 506A, and 508A that show various levels of degradation from scanning, photocopying, printing, etc.

As shown in FIG. 5A, the system 100 selected areas 502A, 504A, 506A, and 508A. For example, element 504A may have been selected based on a large variance in pixel color throughout the area 504A. These areas may be deemed as noticeable. In this example, noticeable or perceptible content may pertain to degraded content (e.g., imagery that may benefit from binarizing according to context/content in the image).

After assigning a noticeability to the elements 502A-508A (and/or additional elements in the image 500A), the system 100 (e.g., feature extraction module 110, context generator 114, and/or pixel variance detector 122) can be used to generate a context for the image 500A that can be used to carry out image binarization and thresholding on the image 500A. For example, the context generator 114 may automatically determine pixel noticeability, assign a saliency level, and generate a saliency map 500B (as shown in FIG. 5B) based on the saliency level(s).

Referring to FIG. 5B, the saliency map 500B is shown for image 500A Here, the areas 502A-508A have been determined to be noticeable, but less important to the content shown in image 500A. Thus, areas 502A-508A are indicated in black, shown by areas 502B-508B in FIG. 5B. The context was selected by pixel variance detector 122, for example, and deemed less meaningful and have been turned black. Similarly, text and number elements were identified by pixel variance detector 122 to be meaningful and as such, the text and number elements were represented in white.

In some implementations, the saliency map 500B may be generated using any number of saliency map algorithms. One example algorithm may include, for image 500A, generating smoothened images, converting the smoothened images to LAB color space, determining a channel means on the LAB color space image, generating a normalized saliency map, and enhancing the normalized saliency image.

Upon completing the saliency map (e.g., the saliency image 500B), the image binarization module 108 may carry out a number of rectangular neighborhood estimations. In particular, module 108 may estimate a neighbor for each pixel in a context image (e.g., saliency map 500B). For example, the image binarization module 108 may determine a minimum and a maximum neighborhood size (e.g., box). For instance, a minimum sized box may be 51 by 51 pixels and a maximum sized box may be 101 by 101 pixels. Such measurements may pertain to enclosing at least two characters printed on a typical typed document. In some implementations, a minimum sized box may be 26 by 40 pixels while a maximum sized box may be 51 pixels by 75 pixels. Other variations in neighborhood box size are possible. The neighborhood rectangular box is applied to the image to compute and maximize a variance within the selected box size. Maximizing the variance pertains to maximizing a variability between pixels within the box.

For each pixel in the saliency image (e.g., the saliency map image 500B), the image thresholding module 124 can calculate a mean value in the rectangular neighborhood for the respective pixel. The mean value of the rectangular neighborhood box is then used as the comparison value for binarizing that particular pixel. The binarized pixels are used to generate the content item output 500C. The content item output 500C includes an improved image of image 500A. In particular, output 500C includes an improved background shown by elements 502C, 504C, 506C, and 508C for each of respective elements 502A, 504A, 506A, and 508A.

Figure 6:
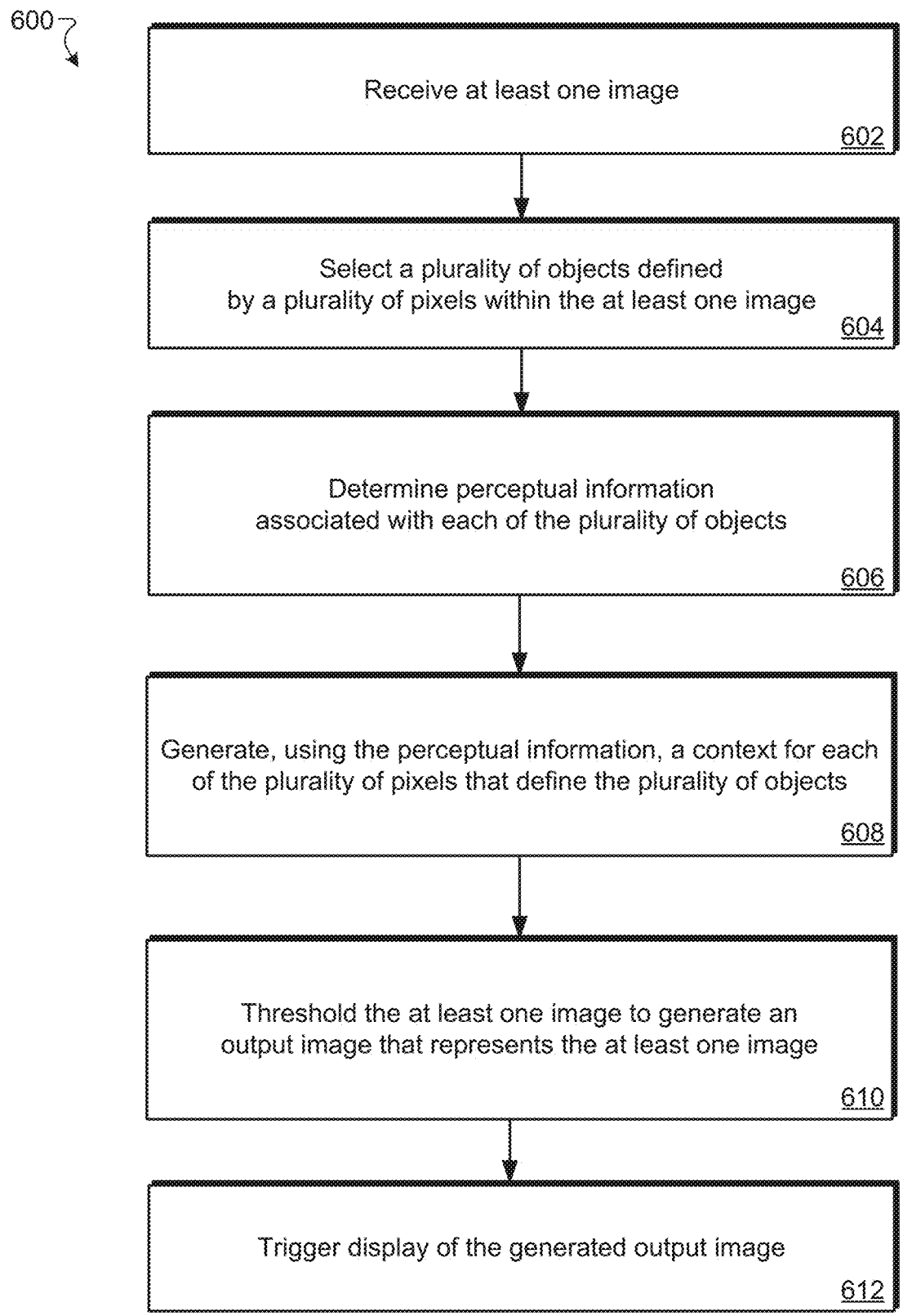
FIG. 6 is an example flowchart illustrating example operations of the system of FIG. 1.

FIG. 6 is an example flowchart illustrating an example process 600 performed by the system of FIG. 1. Process 600 may be performed by a system such as system 100 of FIG. 1. Process 600 takes content (e.g., a content item input image) and determines a context for the image that pertains to visually perceptual information associated with objects in the image. The information may be used to threshold the image to improve visual elements of the image. For example, the process 600 may improve an image with poor resolution because of reproduction, scanning, printing, etc.

Process 600 may be performed by computing device 102, for example. The computing device 102 may include at least one memory 104 including instructions to carry out process 600 and at least one processor 106 that is operably coupled to the at least one memory and that is arranged and configured to execute instructions that, when executed, cause the at least one processor to carry out the following steps.

Process 600 may begin by receiving at least one image (602). For example, a user operating device 112 may submit a content item input 130 that represents at least one image. The content item 130 may be received at computing device 102. In some implementations, computing device 112 is a scanner, printer, or automated equipment that retrieves the image. In such an example, a user may not submit the image, but instead, device 102 may obtain the image without user intervention.

In response to receiving the at least one image, the system 100 may automatically perform a number of steps. For example, the feature extraction module 110 may extract (e.g., select) a plurality of objects defined by a plurality of pixels within the at least one image (604). For example, the feature extraction module 110 may identify and select any number of objects/pixels within the image.

The feature extraction module 110 may operate with the pixel variance detector 122 to determine perceptual information associated with each of the plurality of objects. For example, the pixel variance detector 122 may determine that one or more objects are more visible than another object based on perceptual information associated with the objects. Perceptual information may be defined as information that describes a predisposition to perceive objects and/or pixels within image content in a certain manner. The information may describe and/or define how a human being would visually perceive the objects and/or pixels in the image content. In some implementations, the information may pertain to object and/or pixel weight, color, number, size, luminance, brightness, darkness, just to name a few examples.

The feature extraction module 110 may work with the context generator 114, for example, to generate, using the perceptual information, a context for each of the plurality of pixels that define the plurality of objects (608). In some implementations, the context is based on the perceptual information associated with at least one of the plurality of objects. In some implementations, the perceptual information includes a color variance associated with at least one of the plurality of objects. For example, the context may indicate whether a respective pixel is represented in black or white in the output image. In some implementations, generating a context includes generating a saliency map to represent the at least one image. The saliency map may be based at least in part on the perceptual information associated with at least one of the plurality of objects, as described in detail above.

In some implementations, the image thresholding module 124 may threshold (610), using the context for each respective pixel, the at least one image to generate an output image that represents the at least one image. The output image may be a binarized version of the at least one image. In some implementations, the thresholding is spatially adaptable based on the defined minimum size of the neighborhood and the defined maximum size of the neighborhood. The generated output image may be triggered for display (612).

In some implementations, the process 600 may also include performing a nearest neighbor estimation using the saliency map. The nearest neighbor estimation may include defining a minimum size to a neighborhood used in the nearest neighbor estimation. For example, a minimum size may include a neighborhood that may cover at least two characters (e.g., 51 pixels by 51 pixels). In addition, a maximum size of the neighborhood may be defined. Using the saliency map, the device 102 may estimate, for each pixel in the saliency map, at least one neighbor pixel, calculate a maximized variance for a plurality of pixels located within the defined minimum size and the defined maximum size, and binarize each pixel in the at least one image according to the respective estimation for each pixel. The binarization may include generating the output image to be corrected for degraded image content in the at least one image.

In some implementations, the automatic thresholding described herein may be performed on an embedded computing device. For example, the automatic thresholding and associated steps in the claims may be performed without user intervention on an embedded device that contains special-purpose computing elements enclosed within the device. In some implementations, the device may have access to a network. In some implementations, the device does not have access to a network.

This disclosure describes context aware and spatially adaptive thresholding based on perceptual information. In addition, this disclosure describes the concept of building context in thresholding process using relative perceptual information of objects in the image, threshold workflow automation using perceptual context, and building dynamic neighborhoods using the perceptual context, and using this for thresholding each pixel in the image.

The systems and methods described herein can be used in various tools. For example, the systems and methods can be used in a portable document format scan library, photo editing software, scanning software, electronic document viewers, and electronic document analyzers and related tools.

Implementations of the described subject matter may be utilized in photo scanning libraries, photographic manipulation software, scanning software, document viewers, image recognition software, and/or scanning devices, printing devices, and/or other imaging devices associated with any or all of the above software.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for adaptively thresholding image pixels, the method comprising:
   obtaining at least one image using at least one processor;
   detecting, using the at least one processor, a plurality of objects defined by a plurality of pixels within the at least one image;
   determining, using the at least one processor, perceptual information associated with each of the plurality of objects;
   generating, using the perceptual information, a context for each of the plurality of pixels that define the plurality of objects, wherein generating the context includes generating a saliency map based on a determined Euclidean distance and mean associated with at least a portion of pixels corresponding to a filtered version of the at least one image; and
   automatically thresholding, using the context for each respective pixel, the at least one image to generate an output image that represents the at least one image, the output image being a binarized version of the at least one image.

2. The method of claim 1, wherein the context is further based on the perceptual information associated with at least one of the plurality of objects, the perceptual information including a color variance associated with at least one of the plurality of objects.

3. The method of claim 1, wherein the context indicates whether a respective pixel is represented in black or white in the output image.

4. The method of claim 1, further comprising performing a nearest neighbor estimation using the saliency map, the nearest neighbor estimation including:
   defining a minimum size to a neighborhood used in the nearest neighbor estimation;
   defining a maximum size to the neighborhood used in the nearest neighbor estimation;
   estimating, for each pixel in the saliency map, at least one neighbor pixel;
   calculating a maximized variance for a plurality of pixels located within the defined minimum size and the defined maximum size; and
   binarizing each pixel in the at least one image according to the respective estimation for each pixel, the binarization generating the output image being corrected for degraded image content in the at least one image.

5. The method of claim 1, wherein the thresholding is spatially adaptable based on the defined minimum size of the neighborhood and the defined maximum size of the neighborhood.

6. The method of claim 1, wherein the automatic thresholding is performed on an embedded computing device.

7. A computer program product embodied on a non-transitory computer-readable storage medium and comprising an introspection network and instructions that, when executed by at least one computing device, is configured to cause the at least one computing device to: obtain at least one image using at least one processor; detect, using the at least one processor, a plurality of objects defined by a plurality of pixels within the at least one image; determine, using the at least one processor, perceptual information associated with each of the plurality of objects; generate, using the perceptual information, a context for each of the plurality of pixels that define the plurality of objects, wherein generating the context includes generating a saliency map based on a determined Euclidean distance and mean associated with at least a portion of pixels corresponding to a filtered version of the at least one image; and automatically threshold, using the context for each respective pixel, the at least one image to generate an output image that represents the at least one image, the output image being a binarized version of the at least one image.

8. The computer program product of claim 7, wherein the context is further based on the perceptual information associated with at least one of the plurality of objects, the perceptual information including a color variance associated with at least one of the plurality of objects.

9. The computer program product of claim 7, wherein the context indicates whether a respective pixel is represented in black or white in the output image.

10. The computer program product of claim 7, further comprising performing a nearest neighbor estimation using the context, the nearest neighbor estimation including:
   defining a minimum size to a neighborhood used in the nearest neighbor estimation;
   defining a maximum size to the neighborhood used in the nearest neighbor estimation;
   estimating, for each pixel represented in the context, at least one neighbor pixel;

calculating a maximized variance for a plurality of pixels located within the defined minimum size and the defined maximum size; and binarizing each pixel in the at least one image according to the respective estimation for each pixel, the binarization generating the output image being corrected for degraded image content in the at least one image.

11. The computer program product of claim 10, wherein the thresholding is spatially adaptable based on the defined minimum size of the neighborhood and the defined maximum size of the neighborhood.

12. The computer program product of claim 7, wherein the automatic thresholding is performed on an embedded computing device.

13. A system comprising: at least one memory including instructions; and at least one processor that is operably coupled to the at least one memory and that is arranged and configured to execute instructions that, when executed, cause the at least one processor to: receive at least one image; and in response to receiving the at least one image, automatically: detect a plurality of objects defined by a plurality of pixels within the at least one image; determine perceptual information associated with each of the plurality of objects; generate, using the perceptual information, a context for each of the plurality of pixels that define the plurality of objects, wherein generating the context includes generating a saliency map based on a determined Euclidean distance and mean associated with at least a portion of pixels corresponding to a filtered version of the at least one image; threshold, using the context for each respective pixel, the at least one image to generate an output image that represents the at least one image, the output image being a binarized version of the at least one image; and trigger display of the generated output image.

14. The system of claim 13, wherein the context is further based on the perceptual information associated with at least one of the plurality of objects, the perceptual information including a color variance associated with at least one of the plurality of objects.

15. The system of claim 13, wherein the context indicates whether a respective pixel is represented in black or white in the output image.

16. The system of claim 13, further comprising performing a nearest neighbor estimation using the saliency map, the nearest neighbor estimation including:

defining a minimum size to a neighborhood used in the nearest neighbor estimation;

defining a maximum size to the neighborhood used in the nearest neighbor estimation;

estimating, for each pixel in the saliency map, at least one neighbor pixel;

calculating a maximized variance for a plurality of pixels located within the defined minimum size and the defined maximum size; and binarizing each pixel in the at least one image according to the respective estimation for each pixel, the binarization generating the output image being corrected for degraded image content in the at least one image.

17. The system of claim 16, wherein the thresholding is spatially adaptable based on the defined minimum size of the neighborhood and the defined maximum size of the neighborhood.

* * * * *